United States Patent [19]

Mischo et al.

[11] 4,115,001

[45] Sep. 19, 1978

[54] WEB MARKING APPARATUS

[75] Inventors: Klaus Mischo, Munich; Traugott Liermann, Unterhaching; Karel Pustka, Munich, all of Fed. Rep. of Germany

[73] Assignee: AGFA-Gevaert AG, Leverkusen, Fed. Rep. of Germany

[21] Appl. No.: 792,596

[22] Filed: May 2, 1977

[30] Foreign Application Priority Data

Apr. 30, 1976 [DE] Fed. Rep. of Germany ....... 2619374

[51] Int. Cl.$^2$ ........................ G03B 29/00; B65H 25/26

[52] U.S. Cl. ........................................ 355/29; 226/21; 271/251; 355/50; 355/64

[58] Field of Search ............................ 226/21, 22, 23; 271/251; 355/29, 64, 50, 51

[56] References Cited

U.S. PATENT DOCUMENTS

| | | | |
|---|---|---|---|
| 3,147,898 | 9/1964 | Huck | 226/21 X |
| 3,175,824 | 3/1965 | Albosta | 271/251 |
| 3,635,466 | 1/1972 | Townsend | 271/251 |
| 3,664,561 | 5/1972 | Feiertag | 226/21 |
| 3,709,418 | 1/1973 | Sylvester et al. | 226/22 X |

*Primary Examiner*—Richard A. Wintercorn
*Attorney, Agent, or Firm*—Michael J. Striker

[57] ABSTRACT

An apparatus for marking a longitudinal edge of a travelling web has a marking (e.g. notching) station, upstream but adjacent to which is located an abutment. Upstream of the abutment is located aguide arrangement which urges the web transversely of the direction of web travel at an angle skew to the longitudinal centerline of the web, so as to exert on the web a force acting skew to the centerline in the forward direction of web travel and towards the edge to be marked. This urges the edge in part against the abutment to assure that the web travels in predetermined orientation through the marking station.

13 Claims, 3 Drawing Figures

DRIVE A
DRIVE B

WEB MARKING APPARATUS

BACKGROUND OF THE INVENTION

This invention relates to a web-marking apparatus for marking (e.g. notching) an edge of an elongated web, particularly (but not exclusively) for marking a longitudinal edge of a strip of photographic film.

Equipment of the general type here under discussion is used in the photographic field for various purposes. For example, in modern film-processing laboratories it is customary to develop a whole series of films (each film may come from a different customer) and thereafter to connect the individual films endwise so as to form a long (composite) strip of film which is then passed through automated copying machinery (a printer). In preparation for this printing operation the equipment here under discussion may be used to form in a longitudinal edge of the long film strip a notch opposite each film frame to be copied; these notches are then sensed and thus serve to control the operation of the printer and/or associated devices, e.g. to determine where the respective film frame must be located before printing begins. Another use of such equipment is to form film strip edges with notches which then serve (e.g. in a press-splicer) for splicing-together undeveloped films to identify where film strips (or sections thereof) are to be spliced together.

According to a prior-art proposal the film strip(s) is (are) photoelectrically scanned to determine where the blank (transverse) film portions are located which separate successive film frames from one another. Whenever one of these portions is sensed, a signal is generated which triggers operation of the notching equipment. The notching itself is usually performed by a reciprocating die or punch.

To be notched properly the web must be guided at least at one edge. The prior art proposes to pass the web or film through a flat (i.e. relatively wide but low) channel the width of which corresponds about to the web width. Some webs and most films tend to bow in transverse direction, i.e., intermediate their longitudinal edges. The channel eliminates the bowing and flattens the web so that the web enters the notching station in more or less proper position. However, unless at least one side edge is always in a predetermined position when the web is in the notching station, it is impossible to assure that all successive notches are of the same size and depth. The channel can be made flat enough to meet this requirement, but this brings with it the danger that dust particles and other contaminants in the channel damage the web, i.e. scratch the surface of the web in a photographic film. Such scratches can, incidentally, also develop as the edges of the film scrape along the lateral walls of a (film-guide) channel.

Another proposal of the prior art engages that longitudinal edge of a film which is not being notched, i.e. the one opposite the edge which is being notched, under spring pressure in order to urge the film transversely of the path of movement and to bias the edge-being-notched against a locating abutment of the notching station. This improves the edge-positioning of the film in the notching station but drastically increases the danger of film scratching because it bows the film transversely under the spring pressure so that the longitudinal center part of the film (due to the bowing at the highest point) engages the wall bounding the film channel and can become scratched.

SUMMARY OF THE INVENTION

It is an object of the invention to overcome the prior-art disadvantages.

A more particular object of the invention is to provide an improved web-notching apparatus which continuously maintains a longitudinal edge of a web in contact with a positioning abutment.

A further object is to provide such an apparatus wherein the surface of the web (e.g. the emulsion-carrying surface of a photographic film) is protected against such damage as scratching.

A concomitant object is to provide an apparatus of this type which is simple and reliable.

In pursuance of these objects, and others which will become apparent hereafter, one feature of the invention resides in a web-marking apparatus for marking a longitudinal edge of an elongated web, particularly of a strip of photographic film, having a web marking station having a web inlet side, advancing means for advancing an elongated web in a path towards the inlet side and through the station, an abutment adjacent the inlet side, and guide means adjacent the path for guiding the web in the path and for imparting to the web a component of force acting skew to the path in the direction of web movement and of the longitudinal edge to be marked, so as to urge the edge against the abutment and thereby assure that the web travels in a predetermined orientation through the marking station.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Structure of the Apparatus

Figures 1, 2, 3:
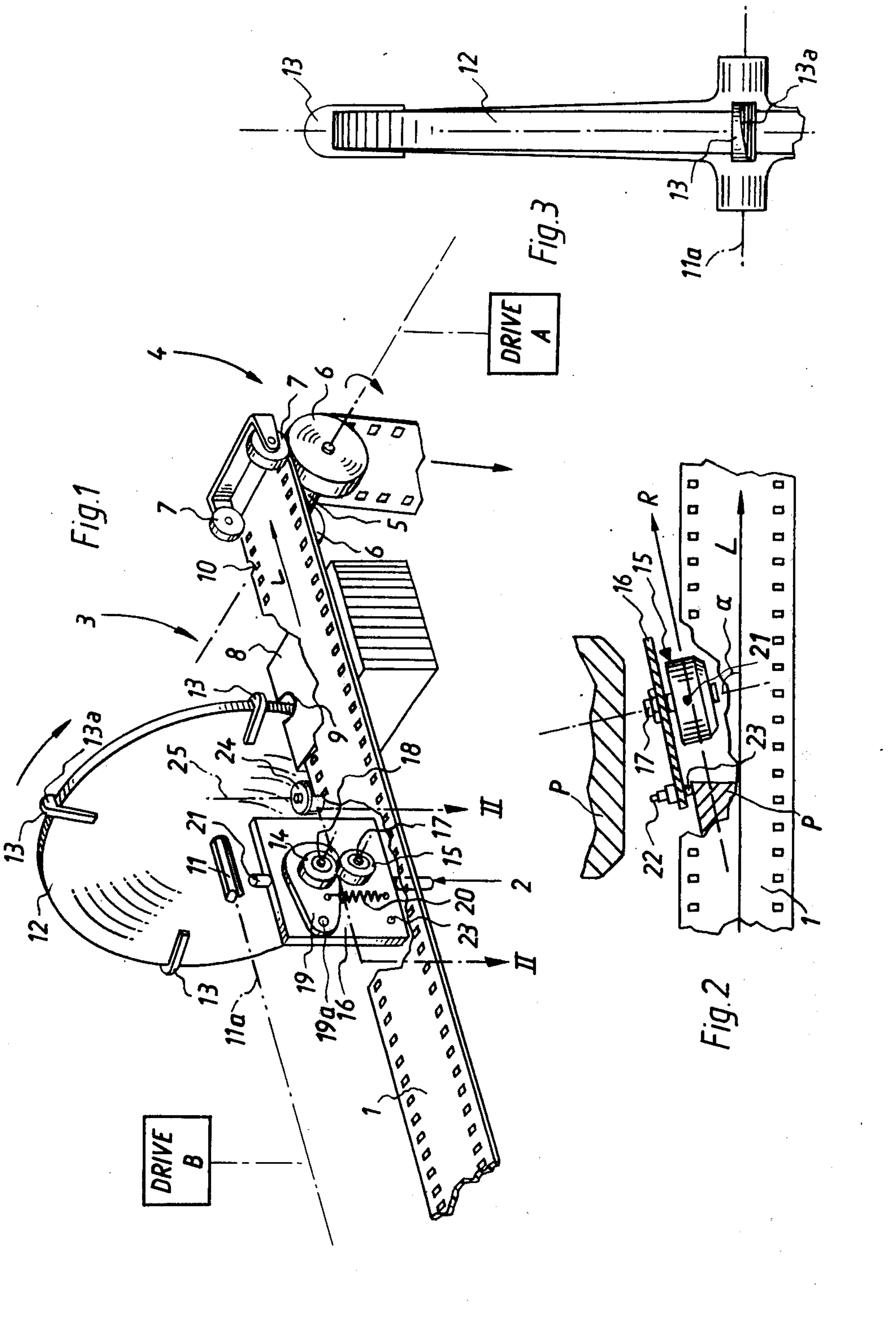
FIG. 1 is a perspective view, partly broken away, showing an apparatus embodying the invention.
FIG. 2 is a fragmentary section, taken on line II—II of FIG. 1.
FIG. 3 is a fragmentary edge-elevational view of a component of the apparatus in FIG. 1.

An exemplary embodiment of the novel apparatus is illustrated in FIGS. 1–3. As the drawing shows, a film strip 1 (which may be composed of two or more, e.g. a large number of spliced-together shorter film strips) is advanced in the direction of arrow l by a film transporting mechanism 4. The film strip 1 travels through a film-guiding station 2 and thereupon through a notching station 3 where one of its longitudinal edges is provided with successive notches 10 (one shown).

The transport mechanism 4 employs a roller 5 connected at its opposite ends with two friction wheels 6 each of which cooperates — and forms a nip with — a pressure roller 7. The rollers 7 are biased against their cooperating friction wheels 6 by suitable biasing means (not illustrated), such as one or more springs. The shaft of roller 5 and wheels 6 is driven by the diagrammatically illustrated drive A which may drive the wheels 6 stepwise (e.g. an electric step-motor) or continuously.

FIG. 1 shows that the axial spacing of the wheels 6 from one another (and also that of rollers 7) is so selected that essentially only the longitudinal edge portions of the film strip 1 are engaged, not the center part thereof.

The notching station 3 (FIG. 1) includes a film table 8 over which the film strip travels. A portion of table 8 is configurated (or provided with) a counter-punch 9 which, in cooperation with the dies or punches 13 punches notches with the edge of film strip 1. In its simplest form the counter-punch 9 can be a groove in an edge of the table 8, and the edge bounding the upper end of the groove then cooperates with the punches 13. Laterally adjacent the travel path of film strip 1 is mounted a punching wheel 12 which rotates on shaft 11 about an axis 11a; in the illustrated embodiment the axis 11a extends parallel to the direction of movement L and is located in a plane which is somewhat above the plane of the film strip 1 (i.e. of the upper surface of table 8) but which could be located lower than illustrated, e.g. in the same plane as the film strip.

The periphery of the wheel 12 carries four equi-angularly spaced punches 13; however, fewer or more than four may be provided instead. The portions of the punches which project radially beyond the periphery are of semi-circular outline (see FIG. 3) dimensioned to be able to enter into the groove which forms part of the counter-punch 9. FIG. 3 also shows that the punches 13 have surfaces (facing forwardly as seen with reference to the direction of rotation of wheel 12) which are inclined in the illustrated manner. Thus, when the cutting edge bounding the respective surface 13*a* cooperates with the cutting edge of the counter-punch 9, it does so not over the entire length of the cutting edge of surface 13*a* at once, but only gradually. In other words, the shearing-off of a portion of the film strip edge (to form a notch 10) progresses circumferentially of the respective surface 13*a* as each punch enters progressively further into the upper end of the groove forming part of the counter-punch 9. This makes for a cleaner cut and requires less cutting energy.

The wheel 12 is driven in rotation by a diagrammatically illustrated drive B which may rotate it stepwise (e.g. an electric step-motor) or continuously. When four of the punches 13 are provided (as shown) and the wheel 12 is driven stepwise (intermittently), then the rest position of the wheel (the position in which it comes to a halt before the next stepwise turn begins) is so selected that in this position the next-to-cut punch 13 is located above the table 8 at an angle of 45°. Of course, this can differ depending upon the number of punches 13.

The film guiding station 2 comprises a pair of cooperating rolls 14, 15 which together form a nip through which the film strip 1 travels, i.e. the plane in which the film strip moves passes through the nip. One of these rolls (here the roll 15) is journalled for rotation about a pivot 17 which is mounted on an upstanding plate 16. The pivot 18 of the other roll (here the roll 14) is secured to a pivot arm 19 which in turn is connected to the plate 16 so that it can pivot relative thereto about axis 19*a*. A spring 20 has its opposite ends connected to the arm 19 and the plate 16 to urge the arm 19 (and hence the roll 14) towards the roll 15.

Plate 16 is mounted for turning movement about an upright axis 21 (if the film strip 1 is guided for horizontal advancement). Opposite sides of the plate 16 are provided with adjustable abutments (e.g. screws) 22 and 23 which cooperate with fixed portions P (diagrammatically shown in FIG. 2) so that the angle $\alpha$ through which plate 16 can pivot to become inclined to the direction L, is limited. Since the abutments 22 and 23 are adjustable, the angle $\alpha$ can be varied, e.g. to compensate for filmwidth differences.

Intermediate the station 2 and the table 8, immediately ahead of the latter, a roll 24 is mounted for rotation about an upright axis 25 which extends normal to the plane of film strip 1; roll 24 is a film guide roll and is advantageously journalled for rotation by means of a (not illustrated) anti-friction bearing. Roll 24 constitutes an abutment for that longitudinal edge of film strip 1 which is to be formed with the notches 10.

OPERATION OF THE APPARATUS

Film strip 1 is withdrawn from a (not illustrated) pay-out reel and advanced by the mechanism 4 to a (not illustrated) take-up reel. The friction rolls 14, 15 engage only the edge portion of film strip 1, under the pressure furnished by the action of spring 20. Due to the freedom of plate 16 to pivot about axis 21, the movement of film strip 1 in the direction L and the friction between the film strip 1 and the rolls 14, 15, the plate 16 is turned about axis 21 in counterclockwise direction (see FIG. 2), with the result that the axes 17, 18 of the rolls move to a position in which they include with the direction L the angle $\alpha$ which in the illustrated embodiment is greater than 90° (FIG. 2). The direction of rotation R of the rolls 14, 15 now is inclined in direction outwardly away from the longitudinal centerline of the film strip 1 (FIG. 2). Since the film strip has some flexibility this means that the rolls 14, 15 superimpose upon its travel in direction L a laterally outwardly directed component which assures that the edge to be notched will always be in engagement with (and guided by) the circumference of roller 24. In turn, this guarantees that every longitudinal increment of film strip 1 will enter the notching station 3 in precisely the same position so that all notches 10 will be of identical depth. If the direction of advancement of the film strip 1 is reversed (e.g. to take the now notched strip back up on the payout reel) the friction between film strip 1 and rolls 14, 15 automatically results in a return-pivoting of plate 16 to a position in which it (i.e. its plane) extends parallel to the direction L; engagement of the abutment 22 with its cooperating portion F prevents pivoting of the plate 16 beyond this position of parallelism.

Upstream of the stations 2, 3 (i.e. to their left in FIG. 1) the film strip 1 may pass through a (not illustrated) device which photoelectrically scans the film strip transparency to detect the blank transverse film portions which separate successive film frames. Such devices are known per se U.S. Pat. No. 3,469,480) and generate a signal when they detect such blank portions. This signal may then be used to interrupt the advancement of film strip 1 in the direction L; due to the correllation between the distance of the scanning location from station 3 and the number of film frames in this distance, each successive film frame will be halted precisely in the required position at station 3. The same signal can be used to initiate rotation of the wheel 12 so that the punch 13 which is in readiness (in FIG. 1 the one located immediately above the film strip) enters into the groove of counter-punch 9 and thus punches a notch. As soon as this entry occurs, a signal may be generated to resume advancement of film strip 1 in the direction L. However, the scanning of the film strip and the manner in which the signals are generated, do not form a part of this invention.

It has been found that the apparatus according to the invention makes it possible to substantially triple the number of notches that can be formed per unit time, as compared with the prior art reciprocating punches. Moreover, the apparatus can be used continuously instead of intermittently, i.e. the film strip 1 and/or the wheel 12 can travel continuously instead of stepwise.

Because each punch 13 moves relative to film strip 1 and counter-punch 9 in an arcuate path, the danger of contamination of the punch 13 with adhesive from a splice (should a notch coincide with a splice) is largely avoided because the punch 13 pulls out of the notch in this arcuate path and the adhesive tends to pull off the punch during this movement. The punched-out film portions are flung off in radial direction and cannot become lodged on the table 8 or the counter-punch 9 as is the case in the prior art. Because the spacing between the cooperating cutting edges of punches 13 and the cutting edge bounding the inlet to the groove which constitutes the counter-punch 9 remains constant if the wheel is appropriately journalled, there is no danger of contact (and wear) between these cutting edges so that the useful life of the punches and the counter-punch is increased; this is usually impossible in the case of reciprocating punches which simply cannot be guided accurately enough to avoid such contact.

The additional time gained from the increase in the notching frequency per unit time may in part be used to transport the film strip 1 with lesser acceleration or deceleration (during stepwise advancement) than would otherwise be possible. This, in turn, makes it possible to position each film frame more precisely on the table 8. Even if some of the saved time is used in this manner, the frequency of notching per unit time will still be twice that which is obtainable with the prior-art equipment.

The number of punches 13 can be selected at will, depending upon the size (diameter) of the wheel 12 and the drive therefor. The counter-punch 9 (i.e. the table 8 or at the portion thereof which is formed with the groove) is advantageously made of a tantalum-alloy which is commercially available under the tradename "Tantung" from the VR/Wesson Co, Waukegan, Ill. However, other materials (e.g. hardened steel) are of course also usable.

If desired, the axis 11*a* of wheel 12 could extend normal to the direction L (to intersect the two longitudinal edges of film strip 1) and be located in the plane of the film strip. The punches would then be laterally adjacent to the circumference of the wheel 12, on that axial face of the wheel 12 which faces the film edge to be notched.

Since the rollers 14, 15 engage only a film edge portion (where the illustrated perforations are located), the actual picture surface of the film strip 1 is completely untouched and cannot be scratched. Even in the event of films of different widths (spliced together lengthwise) or if the spliced film strips are offset relative to each other due to a poor splice, the film edge to be notched is accurately guided through the notching station by the inventive arrangement. Moreover, since there is no film channel the previously present danger, that tears of the perforations or unusually thick splices might cause the film to become jammed in the channel, is avoided.

Of course, instead of notching the web edge the apparatus could also be used to otherwise mark the edge, e.g. by forming slits in the edge, embossing it, imprinting it or the like.

While the invention has been illustrated and described as embodied in a film notching apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a web-marking apparatus for marking an edge of an elongated web, particularly of a strip of photographic film, a combination comprising a web marking station; advancing means for advancing an elongated web in a predetermined path towards and through said web marking station; and guide means adjacent said path for guiding said web so that the same travels in a predetermined orientation through said station, said guide means comprising a pair of rollers defining a nip through which a longitudinal edge portion of the web passes, and means mounting said rollers for rotation about a pair of axes which are permanently parallel with one another and which include with the direction of web travel an angle that opens in said direction and towards said longitudinal edge.

2. A combination as defined in claim 1, wherein said angle is greater than 90°.

3. A combination as defined in claim 1, wherein said guide means are located upstream of said station as considered with reference to the direction of web travel.

4. A combination as defined in claim 1, wherein said mounting means comprises an element on which said rollers are mounted, and pivot means mounting said element for pivotal displacement about a pivot axis which extends normal to said direction of web travel and to said axes of rotation.

5. A combination as defined in claim 4, wherein said pivot axis intersects said axes of rotation closely adjacent to the same.

6. A combination as defined in claim 4, wherein said element comprises an upright plate supported on edge.

7. A combination as defined in claim 4, and further comprising abutments on said element for limiting the pivotal displacement of the same.

8. A combination as defined in claim 4, wherein said element comprises an upstanding plate on which one of said rollers is journalled, an arm having two end portions one of which is pivoted to said plate and on the other of which the other of said rollers is journalled, and biasing means acting upon said arm and pressing said rollers towards one another to define said nip.

9. A combination as defined in claim 4, wherein said element is located proximal to said station.

10. A combination as defined in claim 4, wherein said element is located proximal to said station and upstream of the same as considered with reference to the direction of web advancement.

11. A combination as defined in claim 1; and further comprising an abutment roll mounted for rotation about an axis which extends normal to the plane of the path in which said web travels, said abutment roll having a circumferential surface against which said edge portion of said web is urged by said guide means.

12. A combination as defined in claim 11, wherein said abutment roll is mounted intermediate said station and said guide means.

13. In a web-marking apparatus for marking one of two longitudinal edges of an elongated web, particularly of a strip of photographic film, a combination comprising a web marking station having a web inlet side advancing means for advancing an elongated web in a path towards said inlet side and through said station; an abutment adjacent said inlet side; and guide means engaging said web only at one of said longitudinal edges thereof for guiding said web in said path and for imparting to said web a component of force acting skew to said path in the direction of web movement and of the longitudinal edge to be marked, so as to urge said edge to be marked against said abutment and thereby assure that the web travels in a predetermined orientation through said marking station.

* * * * *